US012179338B2

(12) United States Patent
Brennwald et al.

(10) Patent No.: US 12,179,338 B2
(45) Date of Patent: Dec. 31, 2024

(54) PARALLEL GRIPPER WITH ADAPTIVE CLAMPING SURFACES

(71) Applicant: Tecan Trading AG, Männedorf (CH)

(72) Inventors: Mirco Brennwald, Stäfa (CH); André Häfelfinger, Oberneunforn (CH); Marcel Aschwanden, Eschenbach (CH)

(73) Assignee: TECAN TRADING AG, Männedorf (CH)

( * ) Notice: Subject to any disclaimer, the term of this patent is extended or adjusted under 35 U.S.C. 154(b) by 673 days.

(21) Appl. No.: 17/465,274

(22) Filed: Sep. 2, 2021

(65) Prior Publication Data

US 2022/0176571 A1    Jun. 9, 2022

(30) Foreign Application Priority Data

Dec. 3, 2020  (EP) ..................................... 20211600

(51) Int. Cl.
*B25J 15/00* (2006.01)
*B25J 15/12* (2006.01)

(52) U.S. Cl.
CPC ........... *B25J 15/0028* (2013.01); *B25J 15/12* (2013.01)

(58) Field of Classification Search
CPC .. B25J 15/0028; B25J 15/0033; B25J 15/083; B25J 15/08; B25J 15/12
USPC ....................................................... 294/86.4
See application file for complete search history.

(56) References Cited

U.S. PATENT DOCUMENTS

| 4,593,948 A | * | 6/1986 | Borcea | B25J 13/081 |
| | | | | 294/115 |
| 4,676,541 A | * | 6/1987 | Lord | B25J 15/0475 |
| | | | | 294/90 |
| 6,089,635 A | * | 7/2000 | Lee | G01R 1/04 |
| | | | | 294/907 |

(Continued)

FOREIGN PATENT DOCUMENTS

| DE | 27 42 225 | 3/1979 |
| KR | 10-2020-0096897 | 8/2020 |

*Primary Examiner* — Paul T Chin
(74) *Attorney, Agent, or Firm* — NIXON & VANDERHYE P.C.

(57) ABSTRACT

Arrangements of a gripper finger and a clamp for use in an automated parallel gripper are provided. The arrangements will include first and second gripper fingers that are moveable in a direction of translation (y), whereby the clamp is connected to the gripper finger at an underside thereof, so as to be rotational about a vertical axis of rotation. The clamp has a front face with a contact surface for engagement with a lateral edge of an item to be gripped and has a default orientation in which the front face is parallel to a lateral direction (x) that is perpendicular to the direction of translation (y) and to the vertical rotation axis. The arrangements are additionally provided with a self-alignment feature which includes first and second biasing mechanisms arranged at either side of the rotation axis in lateral direction (x). Each biasing mechanism has a first part connected to the finger and a second part connected to the clamp and is configured to exert a centering force that urges the first and second parts of each biasing mechanism into alignment with each other. When the clamp is in the default orientation, each biasing mechanism is preloaded to exert an equal moment load on the clamp in the direction of translation (y).

13 Claims, 7 Drawing Sheets

(56) References Cited

U.S. PATENT DOCUMENTS

| | | | |
|---|---|---|---|
| 8,602,470 B2 | 12/2013 | Bieler | |
| 9,975,253 B2* | 5/2018 | De Castelbajac | B25J 15/0475 |
| 10,556,338 B1* | 2/2020 | Marchese | B25J 15/0475 |
| 10,702,994 B1* | 7/2020 | Jonas | B25J 15/0616 |
| 11,247,345 B2* | 2/2022 | Chavan Dafle | B25J 15/0023 |
| 11,511,445 B2* | 11/2022 | Son | B25J 9/0015 |
| 2011/0148129 A1* | 6/2011 | Wang | B25B 27/02 |
| | | | 294/86.4 |
| 2015/0071820 A1 | 3/2015 | Philippon et al. | |
| 2017/0072571 A1* | 3/2017 | De Castelbajac | B23P 19/04 |
| 2020/0055197 A1 | 2/2020 | Chavan Dafle et al. | |

\* cited by examiner

PARALLEL GRIPPER WITH ADAPTIVE CLAMPING SURFACES

CROSS-REFERENCE TO RELATED APPLICATIONS

This application is the claims priority to EP 20211600.0 filed Dec. 3, 2020, the entire contents of which is hereby incorporated by reference.

FIELD OF THE INVENTION

The invention relates to a gripper finger of an automated gripper comprising parallel first and second fingers that can be moved towards each other and away from each other for grasping and depositing objects. More specifically, the invention is directed to a gripper finger having a clamping surface that can be used to pick up different items of labware.

BACKGROUND ART

A clamp suitable for gripping first and second types of biological sample holder is disclosed in US2015/0071820. The clamp has first and second arms able to move relative to each other along a gripping position between a first position of gripping and a first position of releasing. Each arm of the clamp includes a vertically extending groove for receiving the edge of a gel card holder, so as to grip it by squeezing the edges along the gripping direction. Contact surfaces of the arm, at either side of the groove, are used for gripping lateral edges of a microplate.

A further example of an automated parallel gripper is disclosed in U.S. Pat. No. 8,602,470. The gripper has replaceable gripper fingers and, in an embodiment, the lower end of each gripper finger is provided with a moveable section or clamp having two contact points in the form of first and second rubber cushions for engaging with lateral surfaces of e.g. a microplate. A planar surface between the first and second rubber cushions can be used to grip items of labware having relatively shorter edges. Such gripper fingers are also used in the Fluent® Finger Exchange System sold by Tecan. Each clamp is attached to the corresponding gripper finger so as to be pivotable about a vertical axis through a limited angular range of a few degrees in either direction. The advantage of pivotably attached clamps is that the clamping surface of each clamp can adopt an optimal orientation relative to the lateral edge of microplates, enabling these items to be reliably and robustly grasped, regardless of potential misalignments and positional inaccuracies. It has been found that robust gripping of items with short edges is less reliable.

Consequently, there is room for improvement.

SUMMARY OF THE INVENTION

The present invention resides in an arrangement of a gripper finger and clamp as defined in claim 1. In use, the arrangement forms part of an automated parallel gripper comprising first and second gripper fingers that are moveable towards each other and away from each other in a direction of translation y, whereby the clamp is connected to an underside of the gripper finger so as to be rotational about a vertical axis of rotation. The clamp has a front face with a contact surface for engagement with a lateral edge of an item to be gripped, the clamp further having a default orientation in which the front face is parallel to a lateral direction x that is perpendicular to the direction of translation and to the vertical rotation axis.

According to the invention, each finger and clamp arrangement is provided with a self-alignment feature which urges the clamp to adopt the default orientation in unloaded condition. The self-alignment feature comprises first and second biasing mechanisms arranged at either side of the rotation axis in lateral direction, whereby each biasing mechanism has a first part connected to the finger and a second part connected to the clamp and is configured to exert a centering force that urges the first and second parts into alignment with each other. Furthermore, when the clamp is in the default orientation, each biasing mechanism is preloaded to exert an equal moment load on the clamp in the direction of translation y.

Suitably, the first and second parts of each biasing mechanism are arranged to have a centre axis that extends in a generally vertical direction. To exert a preload, the centre axis of the first part of each biasing mechanism is offset in y-direction from the centre axis of the corresponding second part. The biasing mechanisms may comprise springs or spring-like elements, whereby elastic deformation generates the centering forces and the preload. Magnetic forces may also be used.

In some embodiments, the self-alignment feature is housed within the finger and clamp arrangement. Suitably, the first part of each biasing mechanism is retained in a mounting recess in the finger, and the second part is retained in a mounting recess in the clamp, which face each other in vertical direction. Each mounting recess has a corresponding centre axis which coincides with the centre axis of the first and second parts of the biasing mechanism. To provide the preload, the centre axis of the mounting recess in the finger and the centre axis of the corresponding mounting recess in the clamp are slightly offset from each other in the direction of translation y when the clamp is in the default orientation.

Suitably, the finger and clamp arrangement is provided with an anti-rotation feature for limiting the amount of relative rotation to a few degrees in either direction. In an embodiment, at least one anti-rotation pin is provided, which is fixedly connected to the clamp and extends into an opening in the finger which has a larger diameter than that of the pin.

In an advantageous development, the anti-rotation feature forms part of the biasing mechanism. The arrangement comprises first and second anti-rotation pins fixed to the clamp and arranged at either side of the rotation axis. Each pin extends into an opening in the finger that has a larger diameter. Each of the first pin and the second pin has a centre axis and serves as the second part of the first and second biasing mechanisms respectively. The first part of the each biasing mechanism is formed by an O-ring arranged around the first and second pins and retained in the corresponding mounting recess in the finger. When the clamp is in the default orientation, the centre axis of each pin is offset from the centre axis of the corresponding O-ring as described above, such that the O-ring is pre-compressed at one side and exerts a preload on the pin. The resiliency of the first and second O-rings permits displacement of the pins relative to the finger when a resulting force at one side of the clamp causes it to rotate around the axis. Compression of the O-rings also provides the centering force that acts on the pins to return them and the clamp to the default orientation, which is maintained due to the preload acting at either side of the rotation axis.

The above embodiment is advantageous as it enables a compact construction using simple and inexpensive components and has been found to provide extremely reliable self-alignment. The O-ring may be a seal made of elastomeric material, such as NBR, EPDM or FKM, or may be formed from O-ring cord.

In a further embodiment, the first and second biasing mechanism are respectively formed by first and second coil springs arranged in vertical direction at either side of the rotation axis. The first part of each biasing mechanism is formed by an upper section of the coil spring that is retained in the corresponding mounting recess in the finger. The second part of each biasing mechanism is formed by a lower section of the coil spring that is retained in the corresponding mounting recess in the clamp. When part of a coil spring is deflected away from its longitudinal centre axis, that part of the spring will be urged to return towards the centre axis. In the further embodiment, the mounting recess in the finger has a centre axis that is offset in y-direction from the centre axis of the corresponding mounting recess in the clamp when the clamp is in the default orientation. The centre axis of the upper and lower sections of each coil spring are thus offset from each other and configured to exert an equal moment load on the clamp at either side of the rotation axis.

In a still further embodiment, sets of magnets are used to provide a centering force that acts on the clamp. Each biasing mechanism may be formed from a first magnet fixed to an underside of the finger, which generates a first magnetic field in axial direction and an opposing second magnet fixed to the clamp, which generates a second magnetic field in axial direction. The first and second magnets may be arranged to repel or to attract. In the default orientation of the clamp, a centre axis of the second magnetic field is offset in y-direction from a centre axis of the first magnetic field, such that an equal moment load is exerted on the clamp at either side of the rotation axis. Preferably, the sets of opposing magnets are housed in mounting recesses as described above.

It is also possible to use other types of biasing mechanisms, which are mounted to external surfaces of the finger and clamp. In one example, the first and second biasing mechanisms are formed by a flexible element, such as a strip of sheet metal, arranged in vertical direction. An upper section of the metal strip acts as the first part of the biasing mechanism and is attached to a planar surface of the finger that faces in the direction of translation y. This planar surface may be a front surface or a rear surface of the finger. The lower section of each strip acts as the second part of the mechanism and is attached to the corresponding front or rear planar surface of the clamp. In such embodiments, the planar surface of the clamp is parallel to the corresponding planar surface of the finger in lateral direction, when the clamp is in the default orientation, but does not lie in the same plane. The clamp surface is slightly offset from the finger surface in the direction of translation y. Thus, the lower section of each metal strip is elastically deformed relative to the corresponding upper section. This elastic deformation provides the moment load at either side of the rotation axis.

As will be understood, the strip of sheet metal that forms the first and second biasing mechanisms is configured to permit a certain amount of torsional deformation between the upper and lower sections, such that the clamp is able to rotate relative to the finger through a limited angular range. Such externally mounted biasing mechanisms thus have the advantage of acting both as an anti-rotation feature and as a self-alignment feature. Instead of a strip of sheet metal, it is also possible to use a length of stiff steel wire or other suitable element that permits torsional deformation between the upper and lower sections of a few degrees in either direction.

The self-alignment feature is particularly important when gripping objects with relatively short edges. The front face of the clamp is preferably provided with at least one contact pad made of e.g. rubber for grasping items of labware via frictional engagement. The contact pad may be a strip that extends in lateral direction on the front face of the clamp. Alternatively, first and second contact pads may be provided for grasping the lateral edge of a labware item such as a microplate. Between the first and second pads, a third contact area or third contact pad may be used for grasping items with shorter edges, such as a reagent carrier.

In a preferred embodiment, the front face of each clamp is provided with a self-centering feature for grasping short items via encompassing engagement. A central portion of the clamp front face is provided with a shaped recess. Preferably, the shaped recess has conical surfaces. In one example, the recess comprises a set of opposed conical surfaces that taper towards a base of the recess in vertical direction and further comprises a set of opposed conical surfaces that taper towards the base in lateral direction. The shaped recess is adapted for use with replaceable gripping handles, which comprise a protrusion with complementarily shaped conical surfaces.

A parallel gripper comprising first and second fingers according to the invention is thus able to reliably and securely grasp many different types of labware. Other advantages will become apparent from the detailed description and accompanying figures.

BRIEF DESCRIPTION OF THE DRAWINGS

FIG. 1b is an exploded view of a lower section of the arrangement depicted in FIG. 1a;

FIG. 3a shows a perspective view of first and second gripper fingers according to the first embodiment grasping an item of labware having a shaped gripping handle FIGS. 3b and 3c respectively show a side cross-sectional view and a top cross-sectional view of the shaped gripping handle engaged in a recess in the front face of the clamp of the gripper finger from FIG. 1a.

It should be noted that items which have the same reference numbers in different figures, have the same structural features and the same functions. Where the function and/or structure of such an item has been explained, there is no necessity for repeated explanation thereof in the detailed description.

DETAILED DESCRIPTION OF EMBODIMENTS

Figure 1A:
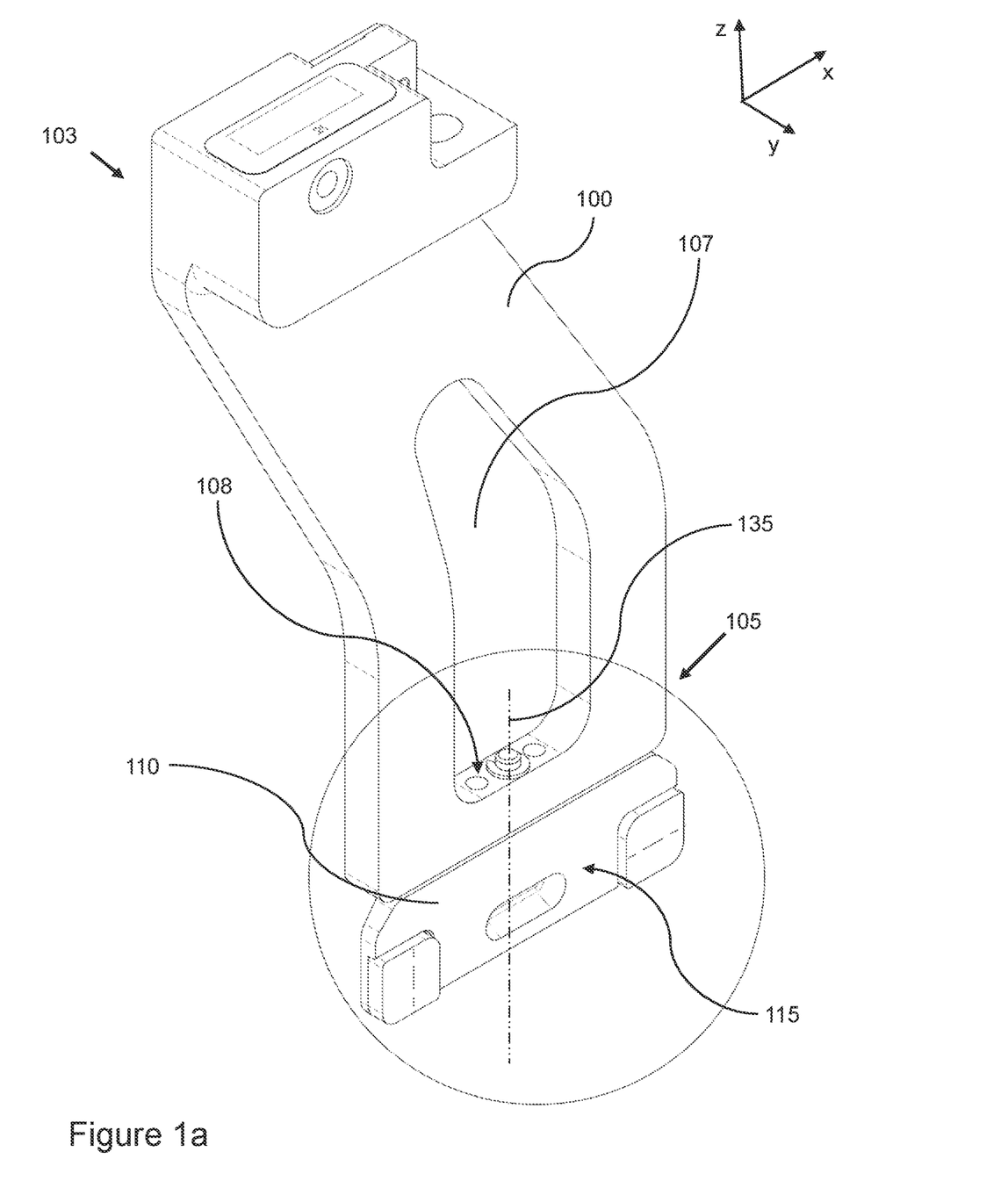
FIG. 1a shows a perspective view of a gripper finger and clamp arrangement according a first embodiment of the invention

FIG. 1a shows an example of a gripper finger 100 according to the invention, which in use forms a first finger of a parallel gripper for picking up and depositing items of labware. An upper section 103 of the finger is provided with to an opening for receiving a holding mandrel of a gripper jaw that is mounted on a linear guide, such that the finger 100 can be attached to and detached from the moveable jaw in a manner such as described in U.S. Pat. No. 8,602,470. Other methods of attaching the finger to a parallel gripper are also possible.

A lower section 105 of the finger 100 comprises a clamp 110 having a front face 115 that is moved in a direction of translation y into contact with one side of a labware item. In order to grasp the item, an opposing face of the clamp on a second finger is moved into contact with an opposite side of the labware item. Each clamp is a separate part that is fastened to an underside of the finger via a central mounting hole that extends in vertical direction z from a bottom surface 108 of a cutout 107 in the finger through to the underside of the finger and a corresponding central mounting hole in the clamp 110.

Figure 1B:
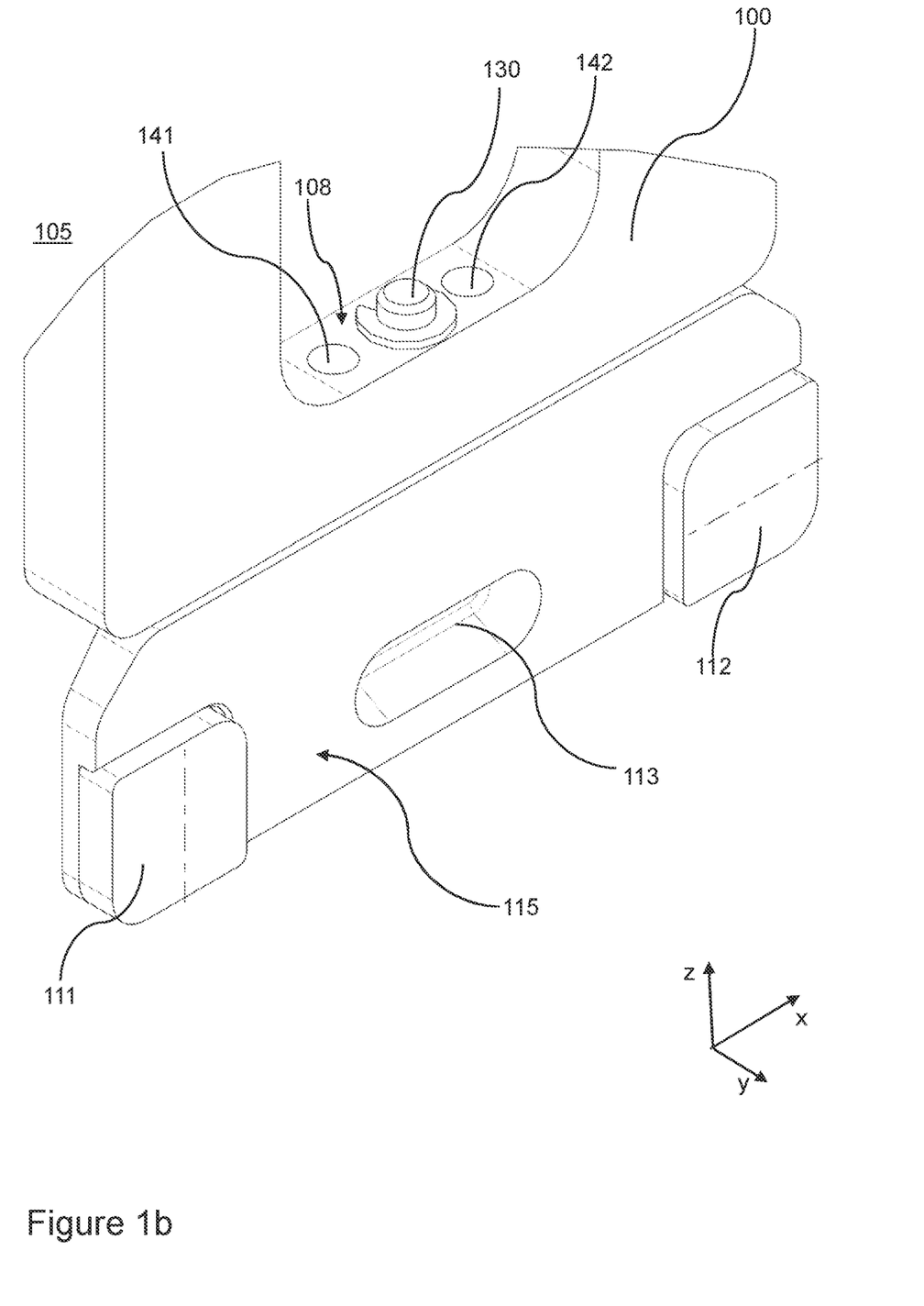

An exploded view of the lower section 105 of the clamp is shown in FIG. 1b. The front face 115 of the clamp is provided with a first contact area 111 and a second contact area 112, spaced from each other in lateral direction x. In the depicted example, the first and second contact areas are executed as rubber contact pads. The first and second contact pads 111, 112 are adapted for grasping the straight lateral edge of an item such as a microplate via frictional engagement. In order to securely and reliably grasp the microplate in circumstances where the edges of the microplate are misaligned with respect to the lateral direction x, each clamp 110 is mounted to the respective finger 100 via a pivot pin 130 and is rotational about a vertical axis 135 (refer FIG. 1a) through an angular range of a few degrees in both directions. When the first and second contact pads 111, 112 of each clamp exert a force in y direction on the lateral edges of the microplate, the front face 115 of each clamp will adopt an optimal orientation in order to compensate for any misalignments.

A parallel gripper according to the invention is adapted to pick up different items of labware, of shorter length than a microplate, using a third contact area 113 arranged between the first and second contact pads. Preferably, the front face 115 of each clamp 110 is provided with a shaped recess 113, which serves as the third contact area, for receiving a complementarily shaped handle of labware items. The recess will be described in more detail later.

Let us assume that in a first action, a parallel gripper according to the invention picks up and deposits a microplate using the first and second contact areas 111, 112, and that the front face of at least one clamp was pivoted to adopt an angular orientation relative to the lateral direction x. If the second action is to pick up an item of labware via the third contact area 113, and the front face of one or both clamps retains the aforementioned angular orientation, there is a risk that the labware item will not be reliably and securely grasped.

According to the invention, each clamp is pivotably mounted to the respective finger 110 in a manner which ensures that each clamp is returned to a default position or default orientation in which the front face is parallel to the lateral direction x of the finger 100. This will be explained also with reference to FIG. 1c, which shows a cross-sectional front view of the mounting arrangement between the clamp and the lower section of the finger, and with reference to FIG. 1d, which shows a cross-sectional top view of the mounting arrangement along line A-A' in FIG. 1c.

Figure 1C:
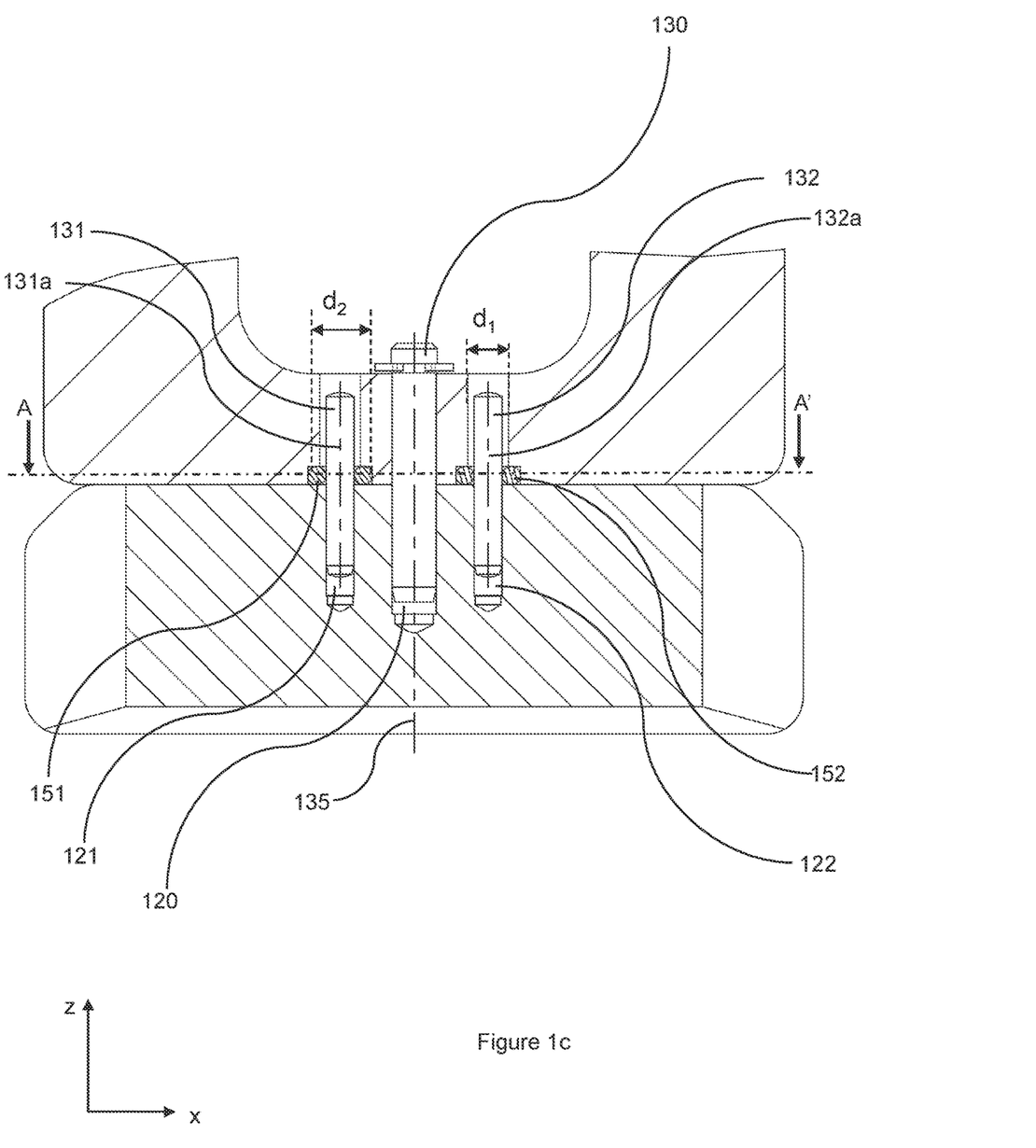
FIG. 1c is a front cross-sectional view of the lower section depicted in FIG. 1b.
Figure 1D:
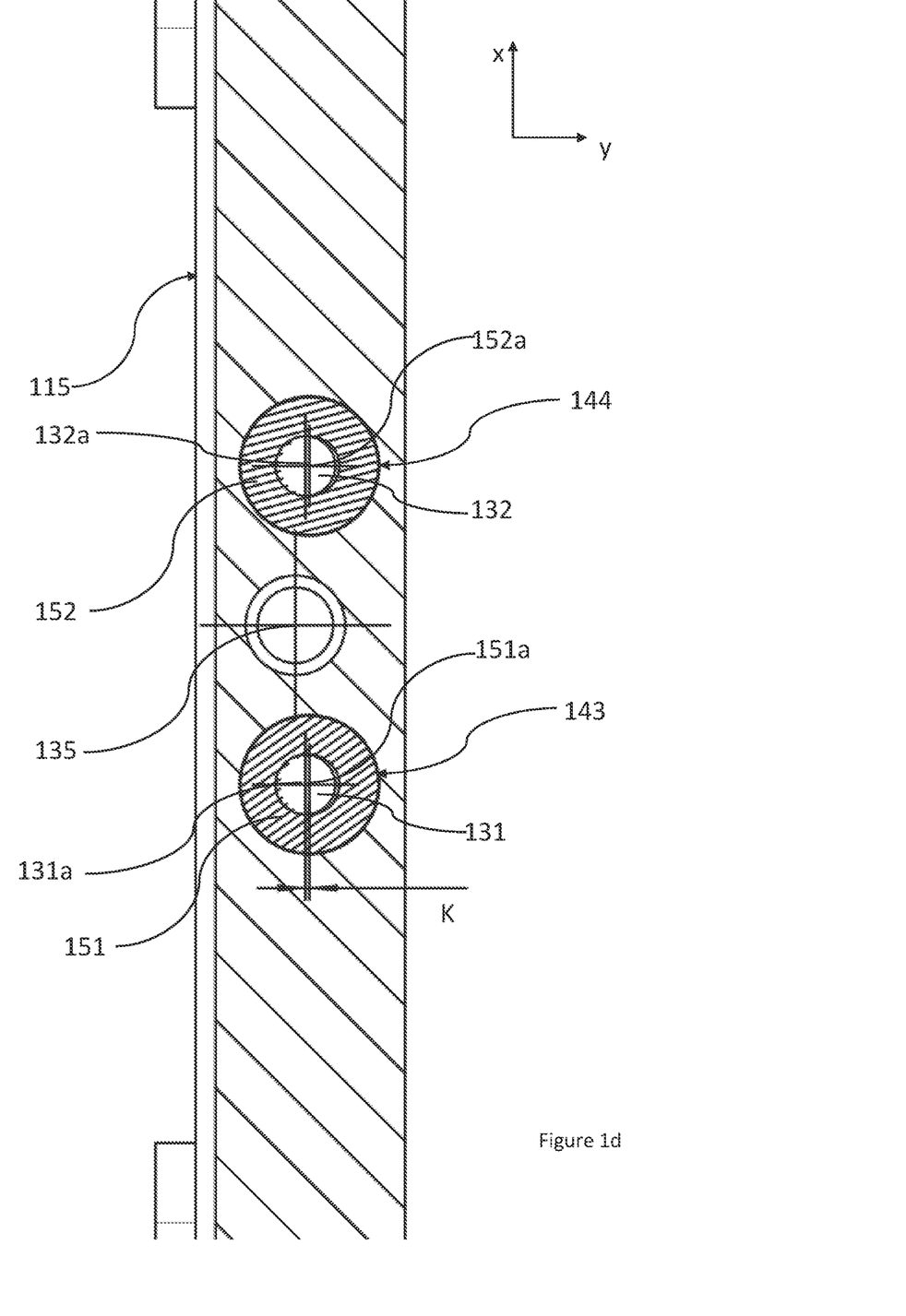
FIG. 1d is a top cross-sectional view taken through line A-A' in FIG. 1c.

As mentioned, each of the finger 100 and the clamp 110 has a central mounting hole for receiving the pivot pin 130. Suitably, the pivot pin is mounted with a press fit in the central mounting hole 120 of the clamp and can rotate in the central hole through the finger about the rotation axis 135. To limit the amount of rotation, the mounting arrangement additionally comprises first and second anti-rotation pins 131, 132 of diameter d which extend at least partly through the clamp and finger. The first anti-rotation pin 131 has a centre axis 131a and the second anti-rotation pin 132 has a centre axis 132a. The clamp 110 is provided with a corresponding first opening 121 and a corresponding second opening 122 at either lateral side of the central mounting hole 120. Suitably, the pins are identical and a centre axis of the first opening 121 and a centre axis of the second opening 122 is equidistant from the rotation axis in lateral direction x. The finger 100 is also provided with first and second openings 141, 142 (refer FIG. 1b) into which the pins extend.

Suitably, the first and second anti-rotation pins 131, 132 are received in the first and second clamp openings 121, 122 with a press-fit. The anti-rotation pins thus move with the clamp when a resultant force at one side of the clamp causes it to rotate about the axis 135. The first and second openings 141, 142 in the finger therefore have a larger diameter $d_1$ than the diameter of the pins 131, 132, so as to permit a certain amount of displacement of the pins 131, 132 relative to the finger 100 as a result of clamp rotation.

In order to return the clamp to the default position and ensure a parallel alignment in unloaded condition, the arrangement is provided with first and second biasing mechanisms which are preloaded to exert an equal moment on the first and second anti-rotation pins 131, 132 when these pins and the clamp are in the default position. The biasing mechanisms work against other to urge the clamp into an orientation in which the front face 115 is parallel to the lateral direction x. In a preferred embodiment, the biasing mechanisms are formed by a combination of pre-compressed first and second O-rings 151, 152 made of resilient material that bear against the first and second anti-rotation pins 131, 132.

The first and second openings 141, 142 in the finger 100 comprise a large diameter portion at the underside of the finger, which serves as a mounting recess 143, 144 (refer FIG. 1d) for the corresponding first and second O-rings 151, 152, whereby these O-rings are arranged around the first and second anti-rotation pins 131, 132. Each mounting recess has a diameter $d_2$ which is larger than the diameter $d_1$ of a main section of the first and second openings 141, 142 such that a shoulder is formed for retaining the O-rings. Each O-ring 151, 152 has an outer diameter that is equal to $d_2$ or very slightly smaller. The internal diameter of each O-ring is equal to the pin diameter or very slightly smaller. With reference to FIG. 1d, the first O-ring 151 has a centre axis 151a and the second O-ring 152 has a centre axis 152a, which coincide with a corresponding centre axis of the first and second mounting recesses 143, 144 in the finger.

In the depicted default position of the clamp relative to the finger, the front face 115 of the clamp is parallel to the lateral direction x, and the centre axes 131a, 132a of the first and second anti-rotation pins are in their "undisplaced" position. As will be understood, the resilient material of the O-rings permits deformation and allows a small amount of displacement of each pin 131, 132 relative to the finger when a load acts on the clamp that causes rotation about the axis 135. In the depicted example, the pins and O-rings are adapted to permit an angular rotation of the clamp relative to the finger of approximately 3 degrees in either direction. Other values are, of course, possible.

To create a preload that will return the clamp to the default orientation, the centre axis 151a of the first O-ring 151 is offset, in y-direction, from the centre axis 131a of the first anti-rotation pin by a small amount K. The centre axis 152a of the second O-ring is offset from the centre axis 132a the second O-ring by the same amount. Consequently, each O-ring is more compressed at one side of the corresponding pin and exerts the same force on the corresponding pin when that pin is the default position.

Let us assume that a slight rotation of the clamp in anticlockwise direction causes a displacement of the first pin 131 which results in the first O-ring 151 losing its precompression. The second pin 132 will be displaced so as to cause additional precompression of the second O-ring 152. Upon removal of the load which caused the rotation, the additionally compressed second O-ring 152 acts on the second pin 132 to move that pin back to its default position and rotate the clamp in clockwise direction. The first pin 131 will be moved back to its default position in which the first O-ring 151 is again somewhat pre-compressed and rotation stops when the forces acting on the first and second pins at either side of the rotation axis 135 are in equilibrium.

Figure 2:
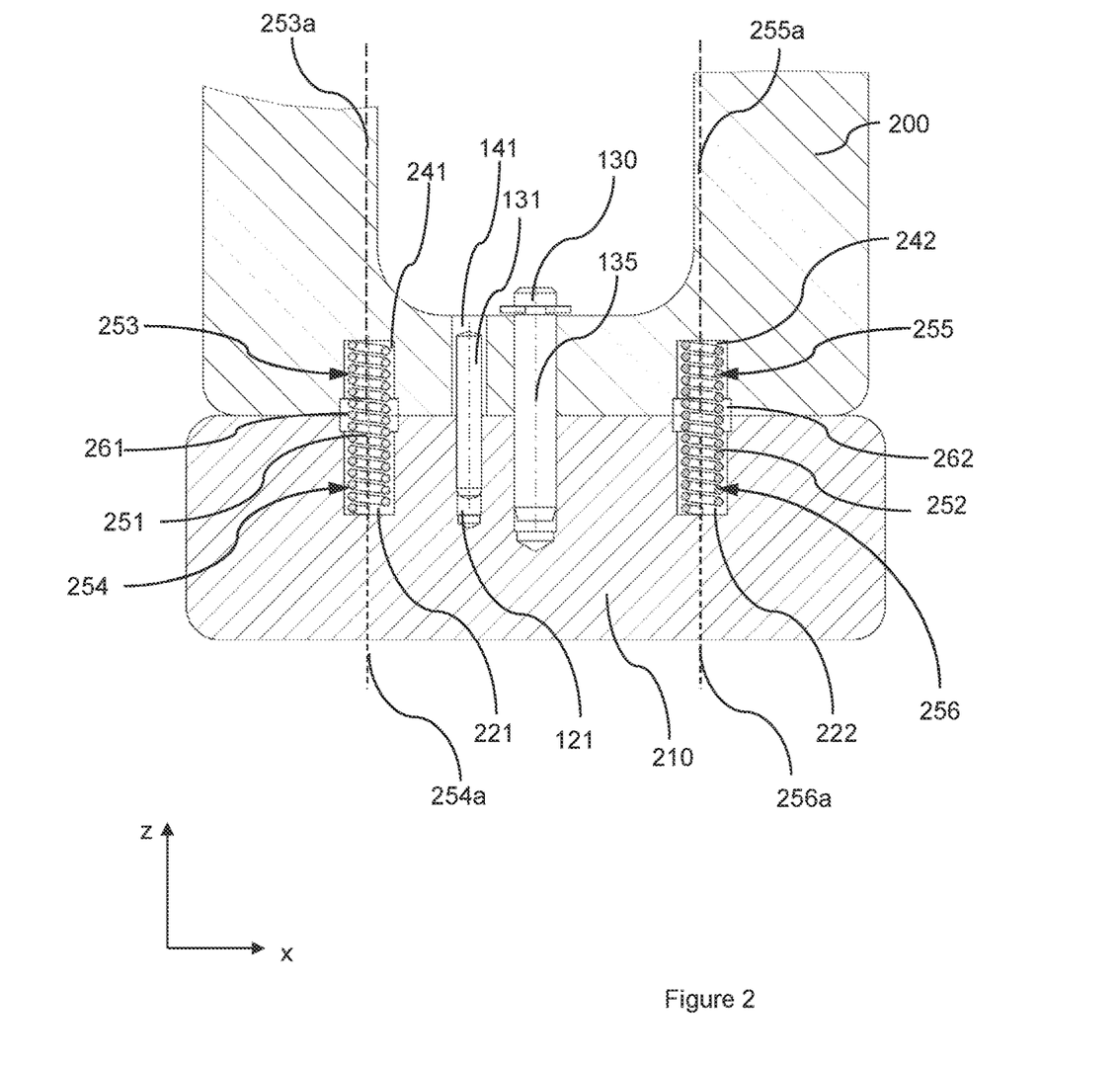
FIG. 2 shows a front cross-sectional view of the lower section of a finger and clamp arrangement according to a second embodiment of the invention.

A further embodiment of a finger and clamp arrangement according to the invention is shown in FIG. 2. The clamp 210 is mounted to the finger 200 via a pivot pin 130 in the same manner as described above. To limit rotation about the axis 135, the arrangement is provided with a single anti-rotation pin 131 that is press-fit into an opening 121 in the clamp and extends into a corresponding opening 141 in the finger that has a larger diameter than the pin. The first and second biasing mechanisms are formed by first and second coil springs 251, 252 which are arranged at either side of the pivot pin 130 in lateral direction x such that a longitudinal axis of each spring extends in generally vertical direction z.

An upper section 253, 255 of the first and second springs respectively is housed and retained in a corresponding mounting recess 241, 242 in the finger 200. A lower section 254, 256 of the first and second springs respectively is housed and retained in a corresponding mounting recess 221, 222 in the clamp 210. In order to generate a preload, a centre axis of each mounting recess 241, 242 in the finger 200 is offset in y-direction from a centre axis of the corresponding mounting recess 221, 222 in the clamp 210. Thus, when the clamp is in the default position, a centre axis 254a of the lower section of the first spring 251 is deflected somewhat relative to a centre axis 253a of the upper section of the first spring. Likewise, a centre axis 256a of the lower section of the second spring 252 is deflected somewhat relative to a centre axis 255a of the upper section of the second spring. The lower section of the first and second springs therefore exerts an equal centering force on the clamp in y-direction, via the clamp mounting recesses 221, 222, at either side of the rotation axis.

The lower section of each spring moves with the clamp 210 when a resultant force on one side causes rotation about the axis 135 and to permit deflection of the coils, an interface between the respective first and second mounting recess 141, 142 in the finger and the first and second mounting recess in the clamp 221, 222 is suitably provided with a corresponding cavity 261, 262 having a significantly larger diameter than the outer diameter of each spring 251, 252.

Preferably, identical coil springs 251, 252 are used and the centre axes of the mounting recesses 241, 242 in the finger are equidistant from the rotation axis 135. Likewise, when the clamp is in the default position, the centre axes of the mounting recesses 221, 222 in the clamp are equidistant in lateral direction x from the rotation axis 135 and the centre axes of opposing sets of finger and clamp mounting recesses are offset in y-direction by the same amount. Other arrangements are possible by varying the size and stiffness of the coil spring relative to the distance from the rotation axis, if space constraints require this. The important aspect is that each biasing mechanism exerts the same moment load on the clamp when it is in the default position.

Figure 3A:
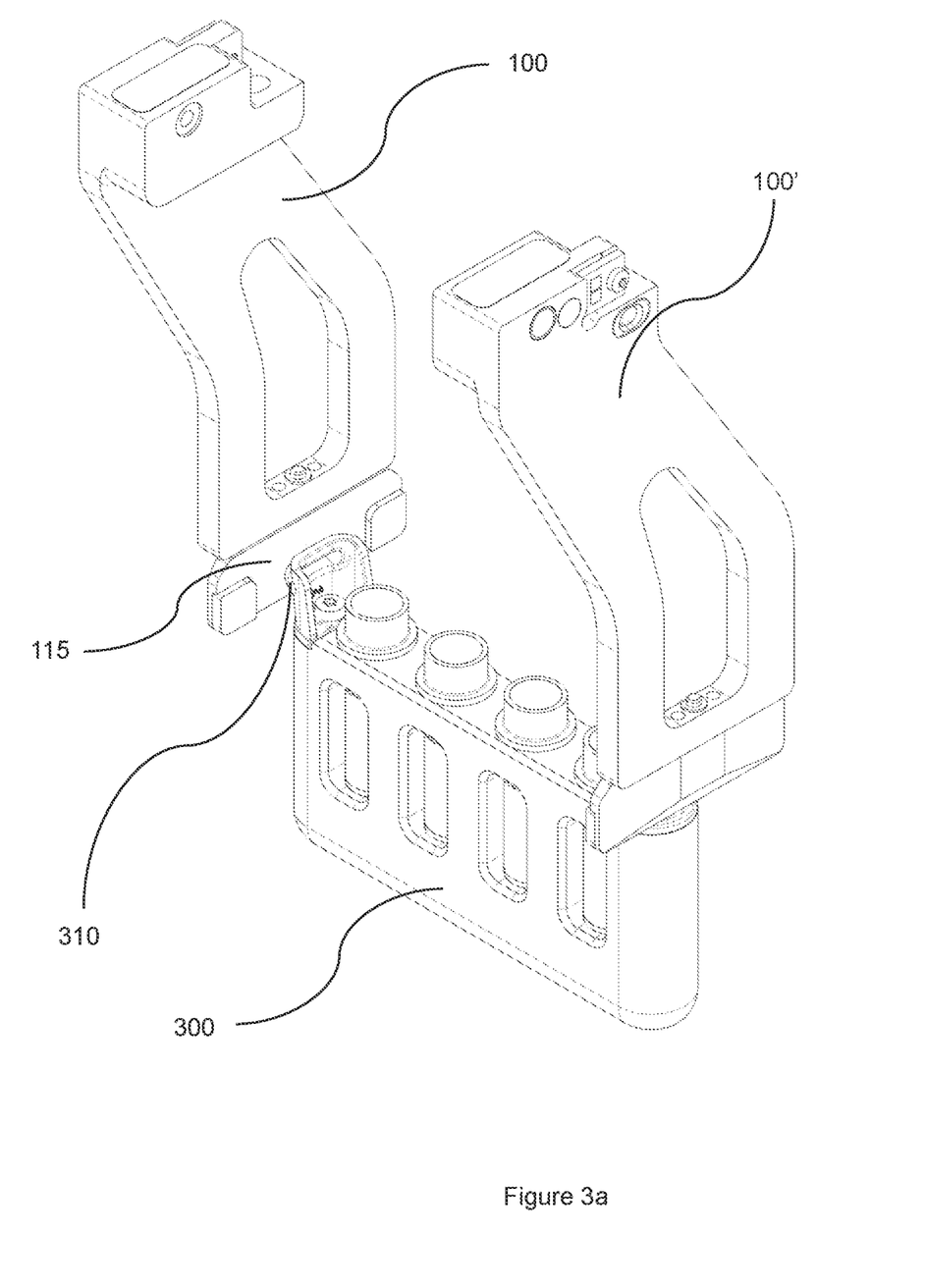

As mentioned, parallel alignment of the clamp is particularly important when picking up an item with short edges. FIG. 3a shows a perspective view of such an item, in the form of a reagent carrier 300, as it is grasped between first and second parallel gripper fingers 100, 100' according to the first embodiment. Preferably, opposite edges of the carrier 300 are provided with a gripping handle 310 having a shaped protrusion that fits into a complementarily shaped recess 113 in the front face 115 of each clamp 110 (refer also FIG. 1b).

Figures 3B, 3C:
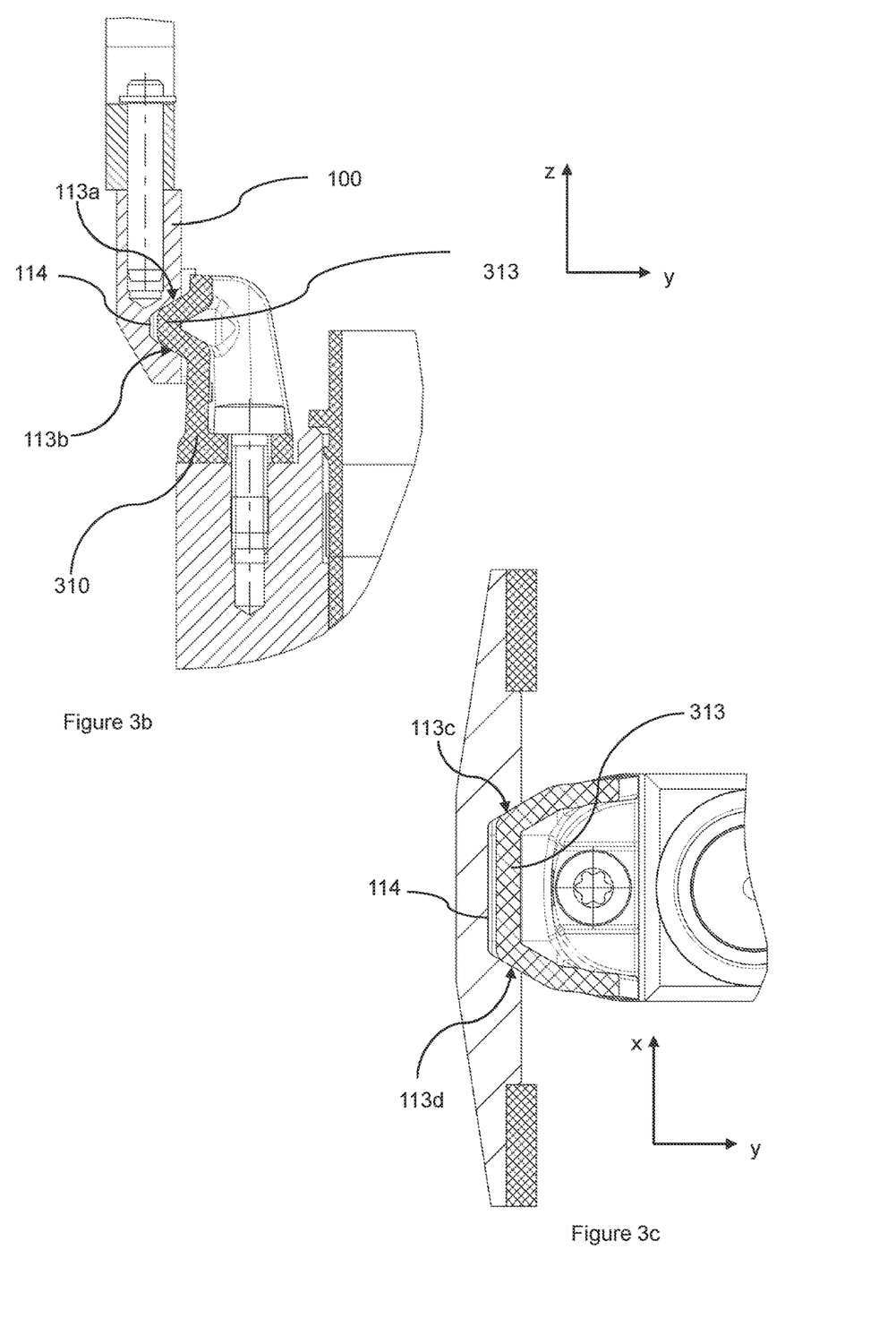

FIGS. 3b and 3c respectively show a side and a top cross-sectional view of a handle 310 in gripped engagement with the shaped recess 113. The handle is preferably a separate part made of e.g. moulded polymer material, which is attached to the reagent carrier 300 via e.g. a screw. This enables gripping handles to be provided on different types of labware. The handle comprises a protrusion 313 with conical surfaces that taper towards the front of the protrusion in z-direction and in x-direction. The recess 113 in the clamp 110 is likewise provided with a first set of opposed conical surfaces 113a, 113b that taper towards a base 114 of the recess in z-direction, and with a second set of opposed conical surfaces 113c, 113d that taper towards the base 114 in x-direction. In the depicted example, the conical surfaces 113a, 113b, 113c and 113d are tapered at an angle of approximately 30 degrees, although other tapering angles are of course possible. The combination of the conical surfaces of the handle protrusion 313 and the complementarily shaped conical surfaces 113a-113d of the clamp recess 113 acts as a self-centering feature, which compensates for tolerances and positional deviations in both lateral direction x and in vertical direction z. In the depicted example, compensation of approx. 1.5 mm in x- and z-directions is enabled. Other compensation values are, of course, possible.

It has been found that reliable functioning of the self-centering feature is enhanced when the front face 115 of the clamp is parallel to the lateral direction x. A parallel gripper according to the invention, comprising gripper fingers provided with a self-alignment mechanism in combination with a self-centering feature as described above is therefore able to reliably and securely grasp labware items that have relatively short gripping handles, as well as microplates with relatively long straight edges.

Examples, embodiments or optional features, whether indicated as non-limiting or not, are not to be understood as limiting the invention as claimed. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCES AND ABBREVIATIONS

The following list of references and abbreviations is provided for facilitating the interpretation of the drawings and shall not be construed as limiting the claims.
- 100, 100', 200 gripper finger
- 103 & 105 upper and lower section of gripper finger
- 107 cutout in gripper finger
- 108 bottom surface of cutout
- 110, 210 clamp
- 111 & 112 $1^{st}$ and $2^{nd}$ contact area of clamp/$1^{st}$ and $2^{nd}$ rubber pad
- 113 3rd contact area of clamp/shaped recess
- 113a & b opposing conical surfaces of recess, spaced in vertical direction z
- 113c & d opposing conical surfaces of recess, spaced in lateral direction x
- 115 front face of clamp
- 120 central hole in clamp for pivot pin
- 121 & 122 $1^{st}$ and $2^{nd}$ openings in clamp for anti-rotation pins
- 130 pivot pin
- 131 & 132 $1^{st}$ and $2^{nd}$ anti-rotation pins
- 131a & 132a center axis of $1^{st}$ and $2^{nd}$ anti-rotation pins
- 135 clamp rotation axis
- 141 & 142 $1^{st}$ and $2^{nd}$ openings in finger for anti-rotation pins
- 143 & 144 mounting recess for $1^{st}$ O-ring and $2^{nd}$ O-ring
- 151 & 152 $1^{st}$ and $2^{nd}$ O-rings
- 151a & 152a centre axis of $1^{st}$ and $2^{nd}$ O-rings
- 221 & 222 $1^{st}$ and $2^{nd}$ mounting recesses in clamp for coil springs
- 241 & 242 $1^{st}$ and $2^{nd}$ mounting recesses in finger for coil springs
- 251 & 252 $1^{st}$ and $2^{nd}$ coil springs
- 253 & 254 upper and lower section of $1^{st}$ coil spring
- 253a & 254a centre axis of upper and of lower section of $1^{st}$ spring
- 255 & 256 upper and lower section of $2^{nd}$ coil spring
- 255a & 256a centre axis of upper and of lower section of $2^{nd}$ spring
- 261 larger-diameter portion at interface between $1^{st}$ mounting recess in clamp and $1^{st}$ mounting recess in finger
- 262 larger-diameter portion at interface between $2^{nd}$ mounting recess in clamp and $2^{nd}$ mounting recess in finger
- 300 reagent carrier
- 310 gripping handle
- 313 protrusion on gripping handle
- x lateral direction
- y direction of translation
- z vertical direction
- K offset between centre axis of pivot pin and centre axis of O-ring
- $d_1$ diameter of opening in finger for anti-rotation pin
- $d_2$ diameter of mounting recess for O-ring

The invention claimed is:

1. An arrangement of a gripper finger and a clamp for use in an automated parallel gripper comprising:

first and second gripper fingers that are moveable towards each other and away from each other in a direction of translation (y), wherein the gripper finger extends in a vertical direction (z) perpendicular to the direction of translation (y) and the clamp is connected to the gripper finger at an underside thereof so as to be rotational about a vertical axis of rotation parallel to the vertical direction (z), and wherein the clamp has a front face with a contact surface for engagement with a lateral edge of an item to be gripped, the clamp having a default orientation in which the front face is parallel to a lateral direction (x) that is perpendicular to the direction of translation (y) and to the vertical axis of rotation that is parallel to the vertical direction (z), and wherein the arrangement further comprises a self-alignment mechanism which comprises first and second biasing mechanisms arranged at either side of the rotation axis in the lateral direction (x) which urges the clamp to adopt the default orientation in an unloaded condition of the clamp, wherein:

(i) each biasing mechanism has a first part connected to the finger and a second part connected to the clamp and is configured to exert a centering force that urges the first and second parts of each biasing mechanism into alignment with each other; and (ii) when the clamp is in the default orientation, each biasing mechanism is preloaded to exert an equal moment load on the clamp in the direction of translation.

2. The arrangement of claim 1, wherein the first part of each biasing mechanism has a centre axis;

the second part of each biasing mechanism has a centre axis; and in the default orientation, the centre axis of the first and second parts of each biasing mechanism are slightly offset from each other in the direction of translation (y), so as to generate the preload.

3. The arrangement of claim 1, wherein the first part of each biasing mechanism is retained in a corresponding mounting recess in the gripper finger;

the second part is retained in a corresponding mounting recess in the clamp, wherein corresponding recesses in the finger and the clamp face each other in the vertical direction (z); and in the default orientation of the clamp, a centre axis of each mounting recess in the finger is offset in the direction of translation (y) from a centre axis of the corresponding recess in the clamp.

4. The arrangement according to claim 3, wherein the first and second biasing mechanisms are respectively formed by first and second coil springs arranged in generally vertical direction, and wherein the first part of each biasing mechanism is formed by an upper section of the corresponding coil spring, which is retained in the corresponding mounting recess in the gripper finger;

the second part of each biasing mechanism is formed by a lower section of the corresponding coil spring, which is retained in the corresponding mounting recess in the clamp; and in the default orientation of the clamp, a centre axis of each upper section of the coil spring is offset from a centre axis of the corresponding lower section.

5. The arrangement of claim 1, further comprising at least one anti-rotation pin that is fixed to the clamp and extends into an opening in the gripper finger, wherein the opening has a larger diameter than a diameter of the at least one anti-rotation pin.

6. The arrangement according to claim 5, comprising first and second anti-rotation pins arranged at either side of the vertical rotation axis in the lateral direction (x), wherein:

the first and second anti-rotation pins respectively form the second part of each biasing mechanism;

the first part of each biasing mechanism is formed by a resilient O-ring that is retained in the corresponding mounting recess in the gripper finger, wherein the mounting recess forms part of the opening in the gripper finger through which the respective anti-rotation pin extends; and in the default orientation, the centre axis of each pin is offset from the centre axis of the corresponding O-ring, such that each O-ring is pre-compressed between the mounting recess and one side of the corresponding pin in the direction of translation (y).

7. The arrangement according to claim 1, wherein each biasing mechanism comprises a set of first and second magnets arranged opposite from each other in vertical direction, and wherein the first magnet of each set is fixed to the gripper finger;

the second magnet of each set is fixed to the clamp; and in the default orientation, a centre axis of the magnetic field generated by each first magnet is offset in the direction of translation (y) from a centre axis of the magnetic field generated by each corresponding second magnet.

8. The arrangement according to claim 7, wherein the first and second magnets in each biasing mechanism are arranged so as to have attracting polarities or are arranged to as to have repelling polarities.

9. The arrangement according to claim 1, wherein each biasing mechanism is formed by a flexible element that permits elastic deformation via torsion and bending;

a first part of each flexible element is attached to an external, planar surface of the gripper finger, wherein the planar surface faces in the direction of translation (y);

a second part of each flexible element is attached to an external, planar surface of the clamp that faces in the same direction of translation (y); and the planar surface of the clamp is offset from the corresponding planar surface of the gripper finger in the direction of translation (y) such that the second part of each flexible element is elastically deformed relative to the corresponding first part, so as to generate the preload in the default orientation.

10. The arrangement according to claim 1, wherein the front face of the clamp is provided with at least one contact pad having a contact surface with a high coefficient of friction.

11. The arrangement according to claim 10, wherein the front face is provided with first and second contact pads which are spaced in the lateral direction (x).

12. The arrangement according to claim 1, wherein the front face of the clamp comprises a shaped recess having a first set of opposed conical surfaces that taper towards a base of the recess in the vertical direction (z) and a second set of opposed conical surfaces that taper towards the base in the lateral direction (x).

13. An automated parallel gripper comprising first and second gripper fingers provided with the arrangement of the gripper finger and clamp according to claim 1.

* * * * *